(12) United States Patent
Rajamanthiram et al.

(10) Patent No.: US 8,601,079 B2
(45) Date of Patent: Dec. 3, 2013

(54) FAST MANEUVERING AND HIGH-SPEED DATA ATTACHMENTS FOR MESSAGE SERVICES

(75) Inventors: Ramanathan Rajamanthiram, Bangalore (IN); Valliappan Chettiar Valliappan, Trichirapally (IN)

(73) Assignee: Yahoo! Inc., Sunnyvale, CA (US)

( * ) Notice: Subject to any disclaimer, the term of this patent is extended or adjusted under 35 U.S.C. 154(b) by 85 days.

(21) Appl. No.: 13/306,619

(22) Filed: Nov. 29, 2011

(65) Prior Publication Data

US 2013/0138744 A1  May 30, 2013

(51) Int. Cl.
  *G06F 15/16* (2006.01)
(52) U.S. Cl.
  USPC .......................... 709/206; 715/206; 715/752
(58) Field of Classification Search
  USPC .................................. 709/206; 715/206, 752
  See application file for complete search history.

(56) References Cited

U.S. PATENT DOCUMENTS

| | | | | |
|---|---|---|---|---|
| 8,286,085 | B1* | 10/2012 | Denise | 715/752 |
| 2001/0028363 | A1* | 10/2001 | Nomoto et al. | 345/748 |
| 2008/0168340 | A1* | 7/2008 | Jang | 715/206 |
| 2010/0268601 | A1* | 10/2010 | Bosarge et al. | 705/14.52 |

OTHER PUBLICATIONS http://en.wikipedia.org/wiki/File_system, "File System," Last accessed Nov. 28, 2011, pp. 1-19.
http://windows.microsoft.com/en-US/windows-vista/Add-tags-or-other-properties-to-a-file, "Add tags or other properties to a file," Last accessed Nov. 28, 2011, p. 1.

* cited by examiner

*Primary Examiner* — Liangche A Wang
*Assistant Examiner* — Hao Nguyen
(74) *Attorney, Agent, or Firm* — James J. DeCarlo; Greenberg Traurig, LLP

(57) ABSTRACT

Embodiments are directed towards a message system that stores and tags message attachment files to enable a user to navigate a personalized hierarchical structure of tags ("PHST") and to select files for attachment to a message. The files may be received as a message attachment sent to the user and/or uploaded by the user as an attachment to a message sent from the user. The tags may include automatic tags determined by the system and/or custom tags defined by the user. The PHST may be provided to the user in a graphical user interface that enables the user to expand and/or collapse tags within levels of tags and to select a tag to attach files associated with the selected tag to a message. In some embodiments, targeted advertisements may be provided to the user based on information associated with the tags.

18 Claims, 12 Drawing Sheets

FAST MANEUVERING AND HIGH-SPEED DATA ATTACHMENTS FOR MESSAGE SERVICES

TECHNICAL FIELD

The present invention relates generally to message attachments, and more particularly, but not exclusively to enabling tagging of message attachment files to enable fast maneuvering of message attachment files for a message service.

BACKGROUND

Electronic messages, or emails, are a central means of communication between users over the Internet. Similarly, emails provide a vehicle for communicating and sharing large amounts of information and data between users. One possible method of sharing such information can be in the form of an email attachment. Typically, users can upload a file from a local computer to an email server, where the file is attached to an email. Similarly, users can download a file that is attached to an email to their local computer. In some instances, a user may have to download a file that is attached to one email and then upload the same file to attach the file to a different email. As a result, a user may have to perform multiple uploads and/or downloads to attach files to one email. Therefore, sending email attachments can be tedious, time consuming, and utilize large amounts of bandwidth in uploading and downloading files. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
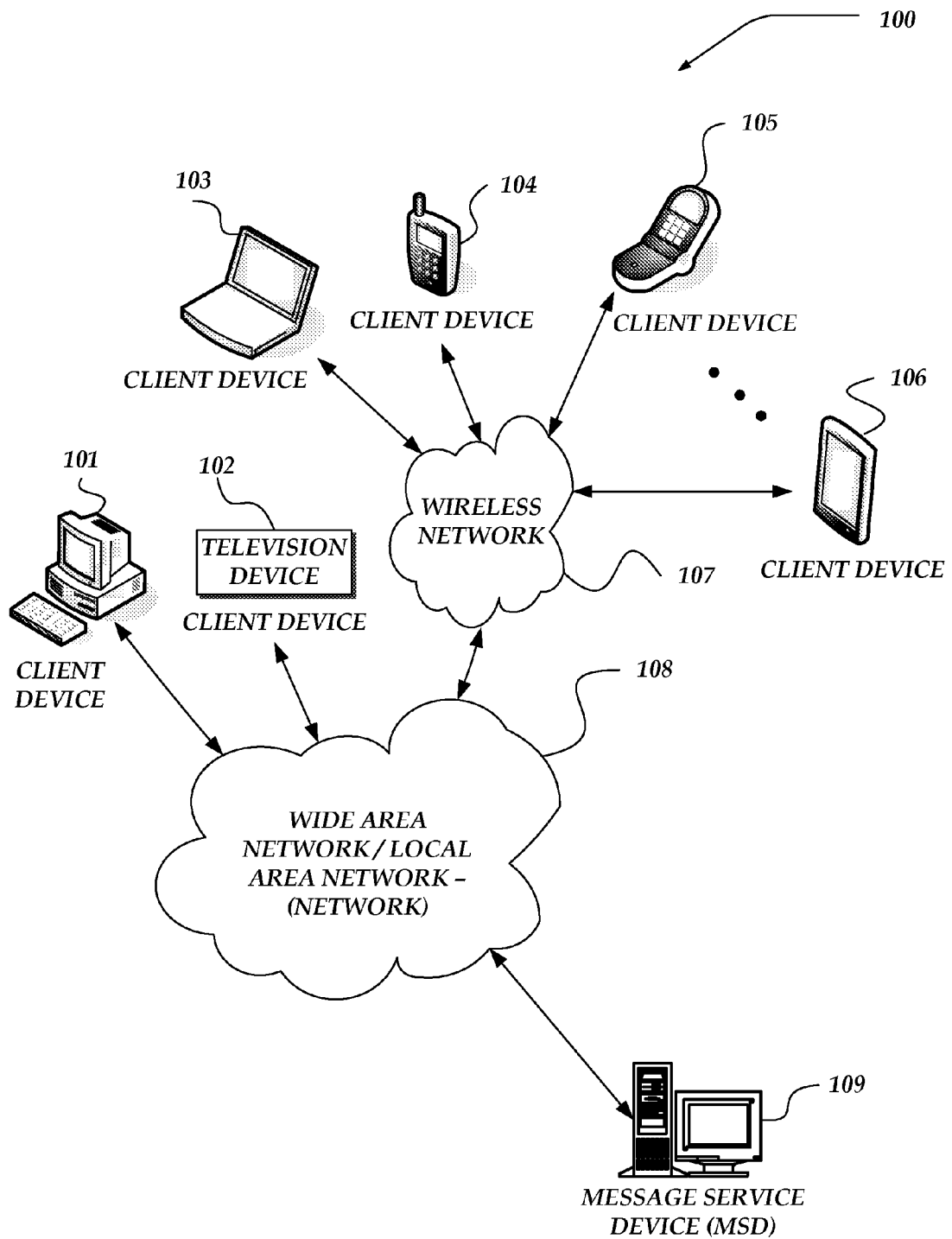
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "automatic" refers to an action that is performed independent of (that is, without a user input) an input and/or action from a user. For example, a tag associated with a file that is automatically generated may be generated at or near real-time when the file is received independent of (i.e., without) any action and/or input from a user.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards at least a message system that stores and tags message attachment files for a user to enable the user to navigate a personalized hierarchical structure of tags ("PHST") and to select one or more tags from within the PHST. In one embodiment, the selection of a tag in turn automatically selects one or more files for attachment to a subsequent message. The files may be received as an attachment to a message sent to the user and/or may be uploaded by the user for attachment to a message sent from the user. In one embodiment, the files may be stored on the server side of the message system such that files selected for attachment may already be in the message system. In another embodiment, the message system may be a web based email system; however, other message systems may also be employed.

In some embodiments, the tags may include one or more automatic tags that are automatically generated, such as when a message with a file attachment is received and/or when a file is uploaded for attachment to a message. In one embodiment, the automatic tags may be determined from a message feature, such as, for example, a sender's name, a message subject, an attachment name, content of a body of the message, and/or the like. In another embodiment, the automatic tags may be determined from a data type and/or an application associated with a file. In yet another embodiment, the automatic tags may be determined from an analysis of the content of the file attachment. In other embodiments, the tags may include one or more custom tags that are defined by a user. In one embodiment, the custom tags may be defined by the user through a graphical user interface ("GUI") that is provided to the user. In some embodiments, a tag may include one or more sublevel of tags, including but not limited to, automatic tags, custom tags, and/or any combination thereof. In one embodiment, a sublevel tag may be a hierarchical tag of automatic tag(s), custom tag(s), or any combination thereof, that identifies the parent tag(s) of the sublevel tag in the hierarchical structure. In some embodiments, a file may be associated with one or more tags and/or each tag may be associated with one or more files.

The PHST may be automatically generated based on automatic tags, custom tags, and/or any combination thereof. The PHST may include a plurality of levels of tags, such that the user may be able to expand and/or collapse tags within the plurality of levels of tags. In one embodiment, the PHST may be displayed to the user in a GUI that is provided to the user. In one embodiment, the GUI may enable the user to navigate the PHST, such as by expanding and/or collapsing tags within the PHST to show and/or hide sublevels of tags. The GUI may also enable the user to select one or more tags within the PHST to attach a file associated with the selected tag(s) to a message. In one embodiment, the user may attach a plurality of files to a message by selecting a specific tag associated with the plurality of files. For example, if the user selects the custom tag "European Trip," then all files associated with the tag "European Trip" can be attached to a message. In another embodiment, the user may navigate the PHST and select a tag that selects an individual file for attachment to the message. In yet another embodiment, selection of a parent tag may automatically select sublevel tags and attach all files associated with the parent tag and the sublevel tags.

In some embodiments, targeted advertisements may be provided to a user based on the tags. In one embodiment, the targeted advertisement may be selected based on information associated with one or more tags. The targeted advertisement may be displayed within a GUI that is provided to the user, such as, for example, on a home page of the user, on a webpage associated with composing a message, within a display of the PHST, and/or the like.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 108, wireless network 107, client devices 101-106, and Message Service Device ("MSD") 109.

One embodiment of client devices 101-106 is described in more detail below in conjunction with FIG. 2. Generally, however, client devices 103-106 may include virtually any portable computing device capable of receiving and sending a message over a network, such as network 108, wireless network 107, or the like. Client devices 103-106 may also be described generally as client devices that are configured to be portable. Thus, client devices 103-106 may include virtually any portable computing device capable of connecting to another computing device and receiving information. Such devices include portable devices such as, cellular telephones, smart phones, display pagers, radio frequency ("RF") devices, infrared ("IR") devices, Personal Digital Assistants ("PDAs"), handheld computers, laptop computers, wearable computers, tablet computers, integrated devices combining one or more of the preceding devices, and the like. As such, client devices 103-106 typically range widely in terms of capabilities and features. In one non-limiting example, a cell phone may have a numeric keypad and a few lines of monochrome liquid crystal display ("LCD") display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including messages with attachments, performing various online activities, or the like. The set of such devices may include devices that typically connect using a wired or wireless communications medium such as personal computers, multiprocessor systems, microprocessor-based or programmable consumer electronics, network PCs, or the like. In one embodiment, at least some of client devices 101-106 may operate over wired and/or wireless network. Client device 102 may include virtually any device useable as a television device. Today, many of these devices include a capability to access and/or otherwise communicate over a network such as network 108 and/or even wireless network 107. Moreover, client device 102 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client device may employ the browser application to perform various activities over a network (online). However, another application may also be used to perform various online activities.

Client devices 101-106 also may include at least one other client application that is configured to receive and/or send content, including email messages and attachments, between another computing device. The client application may include a capability to provide and receive media content, textual content, graphical content, audio content, and the like. The client application may further provide information that identifies itself, including a type, capability, name, and the like. In one embodiment, client devices 101-106 may uniquely identify themselves through any of a variety of mechanisms, including a phone number, Mobile Identification Number ("MIN"), an electronic serial number ("ESN"), Internet Protocol ("IP") address, or other device identifier. The information may also indicate a content format that the mobile device is enabled to employ. Such information may be provided in a network packet, or the like, sent between other client devices, MSD 109, or other computing devices.

Client devices 101-106 may further be configured to include a client application that enables an end-user to log into an end-user account that may be managed by another computing device, such as MSD 109, or the like. Such end-user account, in one non-limiting example, may be configured to enable the end-user to manage one or more online activities, including in one non-limiting example, search activities, social networking activities, browse various websites, make purchases, sell products/services, communicate with other users, or share attachments with others, or the like. However, participation in such online networking activities may also be performed without logging into the end-user account.

Wireless network 107 is configured to couple client devices 103-106 and its components with network 108. Wireless network 107 may include any of a variety of wireless sub-networks that may further overlay stand-alone ad-hoc networks, and the like, to provide an infrastructure-oriented connection for client devices 103-106. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) generation radio access for cellular systems, WLAN, Wireless Router ("WR") mesh, and the like. Access technologies such as 2G, 3G, 4G and future access networks may enable wide area coverage for mobile devices, such as client devices 103-106 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), Wideband Code Division Multiple Access ("WCDMA"), and the like. In essence, wireless network 107 may include virtually any wireless communication mechanism by which information may travel between client devices 103-106 and another computing device, network, and the like.

Network 108 is configured to couple network devices with other computing devices, including, MSD 109, client devices 101 and 102, and through wireless network 107 to client devices 103-106. Network 108 is enabled to employ any form of computer readable media for communicating information from one electronic device to another. Also, network 108 can include the Internet in addition to LANs, WANs, direct connections, such as through a universal serial bus ("USB") port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an IP. In essence, network 108 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

MSD 109 may include virtually any network device usable to operate as a message service to provide messages and message attachment files to client devices 101-106. Such a message service may include, but is not limited to Short Message Service ("SMS") message service, Instant Message ("IM") message service, email message service, alert service, or the like. Moreover, MSD 109 may be configured to perform multiple functions. One embodiment of MSD 109 is described in more detail below in conjunction with FIG. 3. Briefly, however, MSD 109 may include any computing device capable of connecting to network 107 to automatically determine one or more tags associated with one or more received files and to automatically generate a PHST. In one embodiment, MSD 109 may display the PHST to a user of a client device, such as client device 101-106, through a GUI, to enable the user to select one or more tags, which selects at least one file associated with the selected tag for attachment to a message.

Devices that may operate as MSD 109 include various network devices, including, but not limited to personal computers, desktop computers, multiprocessor systems, microprocessor-based or programmable consumer electronics, network PCs, server devices, network appliances, and the like. Although FIG. 1 illustrates MSD 109 as a single network device, embodiments are not so limited. For example, one or more functions of the MSD 109 may be distributed across one or more distinct network devices.

Moreover, MSD 109 is not limited to a particular configuration. Thus, in one embodiment, MSD 109 may operate using a master/slave approach, where one of a plurality of network devices of MSD 109 operates to manage and/or otherwise coordinate operations of the other network devices. In other embodiments, the MSD 109 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
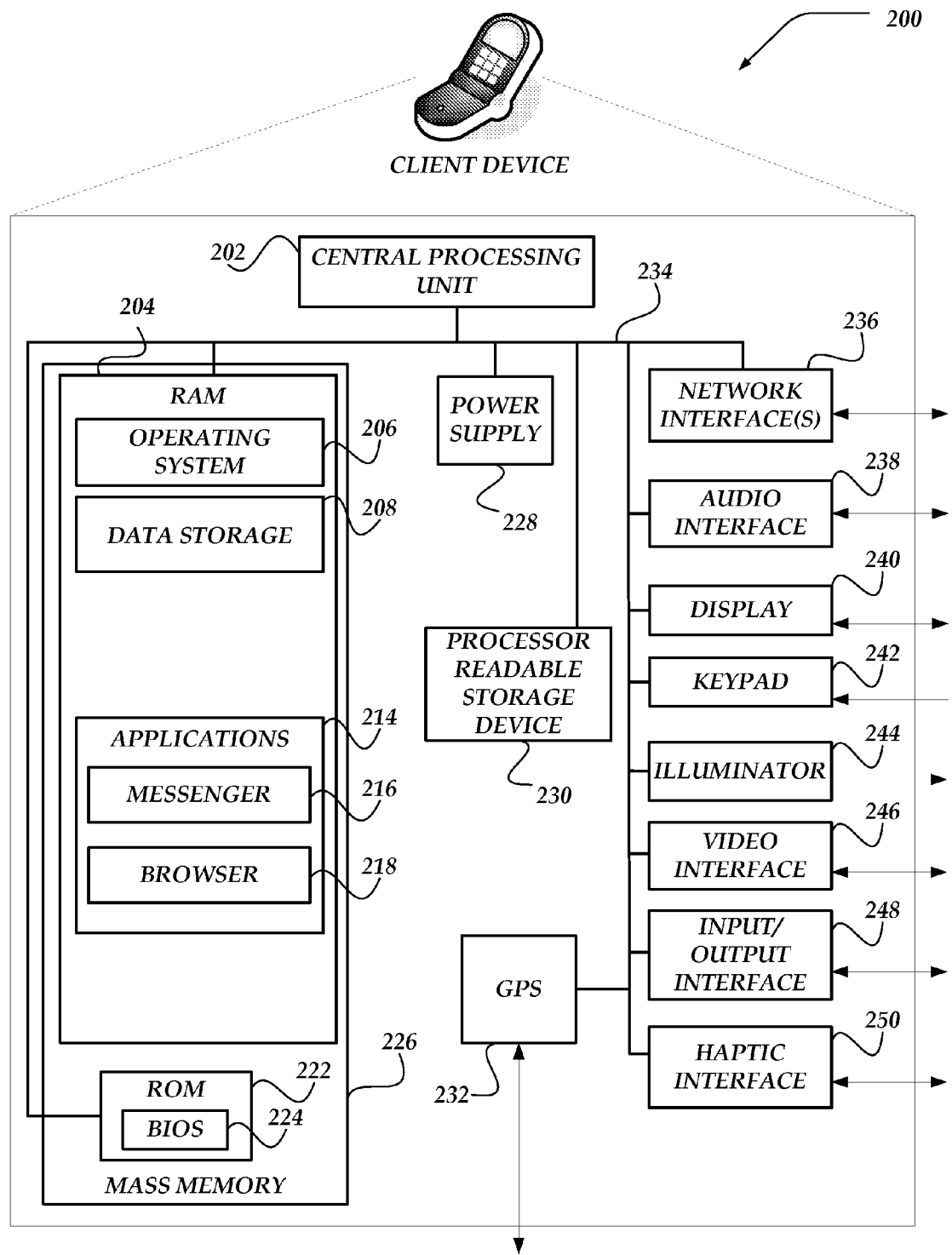
FIG. 2 shows an embodiment of a client device that may be included in a system such as that shown in FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-106 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, and a global positioning system ("GPS") transceiver 232. Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, code division multiple access ("CDMA"), time division multiple access ("TDMA"), user datagram protocol ("UDP"), transmission control protocol/Internet protocol ("TCP/IP"), SMS, GPRS, WAP, ultra wide band ("UWB"), Institute of Electrical and Electronics Engineers ("IEEE") 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signal s such as the sound of a human voice. For example, audio interface 238 may be coupled to a speaker and microphone (not shown) to enable telecommunication with others and/or generate an audio acknowledgement for some action.

Display 240 may be an LCD, gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

GPS transceiver 232 can determine the physical coordinates of client device 200 on the surface of the Earth, which typically outputs a location as latitude and longitude values. GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, messages, files, a user's PHST, or the like. Further, data storage 208 may also store messages, web page content, or any of a variety of user generated content. At least a portion of the information may also be stored on another component of network device 200, including, but not limited to processor readable storage device 230, a disk drive or other computer-readable storage device (not shown) within client device 200. Data storage 208 may also store files for attachment to a message. In one embodiment, a user may utilize client device 200 to upload a file from data storage 208 to MSD 109 for attachment to a message.

Applications 214 may include computer executable instructions which, when executed by client device 200, transmit, receive, and/or otherwise process messages (e.g., SMS, Multimedia Message Service ("MMS"), IM, email, and/or other messages), audio, video, and enable telecommunication with another user of another client device. Other examples of application programs include calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, messenger 216, browser 218, and dynamic augmentation selector ("DAS") 220.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based languages may be employed. In one embodiment, browser 218 may enable a user of client device 200 to access and/or otherwise manage a user message account, such as Yahoo! Mail, Hotmail, Gmail, or the like.

Messenger 216 may be configured to manage a message session using any of a variety of messaging communications including, but not limited to email, SMS, IM, MMS, internet relay chat ("IRC"), Microsoft IRC ("mIRC"), Really Simple Syndication ("RSS") feeds, and/or the like. For example, in one embodiment, messenger 216 may be configured as an IM application, such as AOL (America Online) Instant Messenger, Yahoo! Messenger, .NET Messenger Server, ICQ ("I seek you"), or the like. In one embodiment, messenger 216 may be configured to include a mail user agent ("MUA") such as Elm, Pine, Message Handling ("MH"), Outlook, Eudora, Mac Mail, Mozilla Thunderbird, or the like. In another embodiment, messenger 216 may be a client application that is configured to integrate and employ a variety of messaging protocols, including, but not limited to various push and/or pull mechanisms for client device 200. In one embodiment, messenger 216 may interact with browser 218 for managing messages. As used herein, the term "message" refers to any of a variety of messaging formats, or communications forms, including but not limited to email, SMS, IM, MMS, IRC, or the like.

Illustrative Network Device

Figure 3:
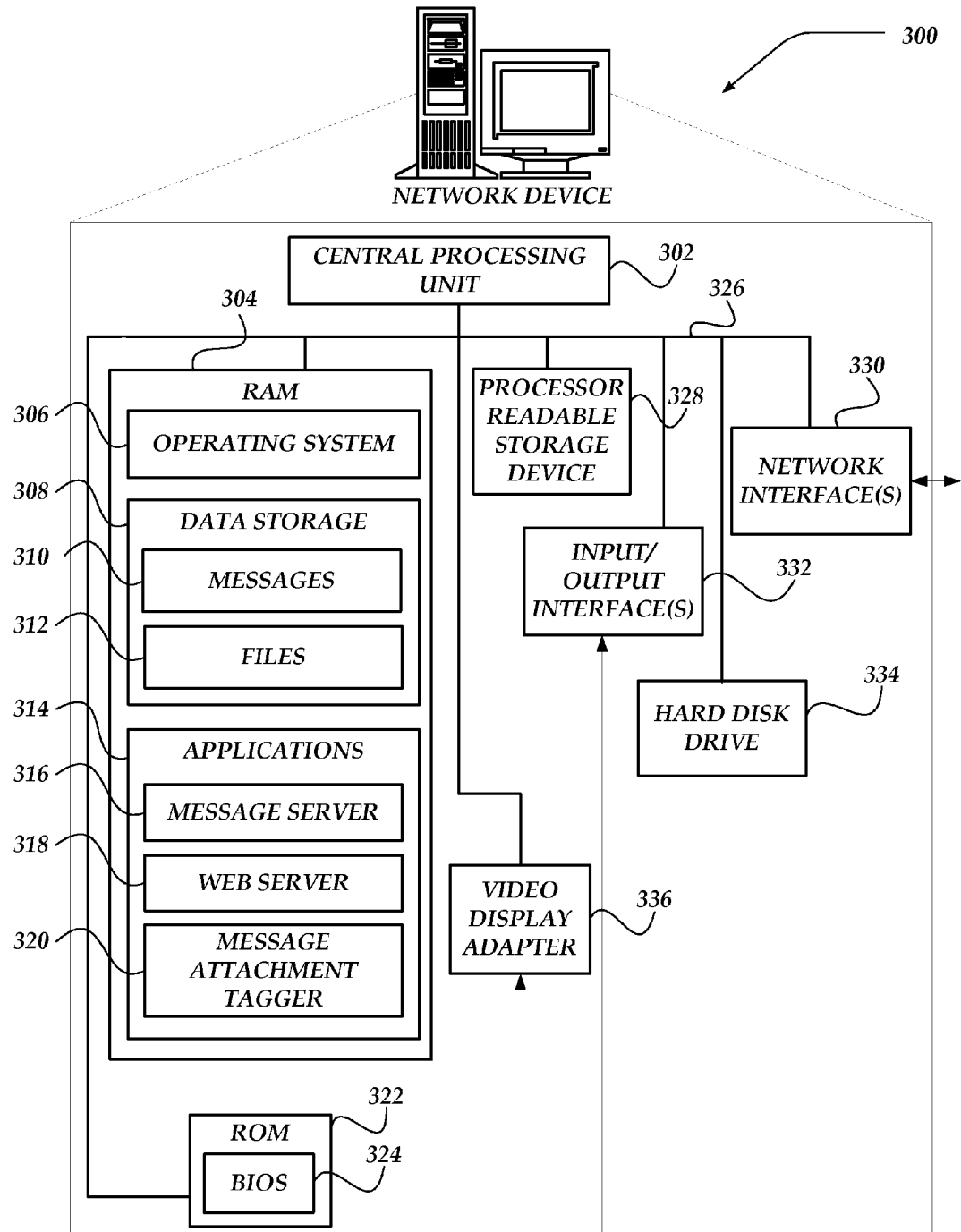
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, or any other device. Network device 300 may represent, for example MSD 109 of FIG. 1.

Network device 300 includes central processing unit 302, processor readable storage device 328, network interface unit 330, an input/output interface 332, hard disk drive 334, video display adapter 336, and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. BIOS 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card ("NIC").

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage medium. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses, or the like. Data storage 308 may further include program code, data, algorithms, and the like, for use by a processor, such as central processing unit 302 to execute and perform actions. In one embodiment, at least some of data storage 308 might also be stored on another component of network device 300, including, but not limited to processor-readable storage device 328, hard disk drive 334, or the like. Data storage 308 may also store messages 310, files 312, and/or PHSTs for one or more users. Messages 310 may include messages sent from a user and/or messages sent to the user. File 312 may include files attached to messages sent to the user and/or files uploaded by the user to attach to a message that is sent from the user.

The mass memory also stores program code and data. One or more applications 314 are loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Message server 316, web server 318, and Message Attachment Tagger ("MAT") 320, may also be included as application programs within applications 314.

Message server 316 may include virtually any computing component or components configured and arranged to forward messages from message user agents, and/or other message servers, or to deliver messages to a local message store, such as data storage 308, or the like. Thus, message server 316 may include a message transfer manager to communicate a message employing any of a variety of email protocols, including, but not limited, to Simple Mail Transfer Protocol ("SMTP"), Post Office Protocol ("POP"), Internet Message Access Protocol ("IMAP"), Network New Transfer Protocol ("NNTP"), or the like. Message server 316 may also be managed by one or more components of message server 316. Thus, message server 316 may also be configured to manage SMS messages, IM, MMS, IRC, RSS feeds, mIRC, or any of a variety of other message types. In one embodiment, message server 316 may enable users to initiate and/or otherwise conduct chat sessions, VOIP sessions, or the like. In one embodiment, message server 316 may be configured to operate in conjunction with MAT 320. In another embodiment, message server 316 may be configured to perform the operations of MAT 320.

Web server 318 represent any of a variety of services that are configured to provide content, including messages, over a network to another computing device. Thus, web server 318 includes, for example, a web server, a File Transfer Protocol ("FTP") server, a database server, a content server, or the like. Web server 318 may provide the content including messages over the network using any of a variety of formats including, but not limited to WAP, HDML, WML, SGML, HTML, XML, Compact HTML ("cHTML"), Extensible HTML ("xHTML"), or the like.

In one embodiment, web server 318 may receive content, including messages and/or attachments from another network device, such as a client device, or the like. Web server 318 may then enable a user to manage a user message account. As such, web server 318 may allow users to compose messages, delete messages, move messages to folders, create folders, or the like. In one embodiment, web server 318 may be configured to operate in conjunction with MAT 320. In another embodiment, web server 318 may be configured to perform the operations of MAT 320.

MAT 320 is configured to automatically generate one or more automatic tags that are associated with one or more files that are associated with a user. In one embodiment, MAT 320 may utilize the one or more automatic tags to automatically generate a PHST for the user. In some embodiments, MAT 320 may be configured to initially provide a GUI for use in displaying and otherwise using PHSTs to manage message attachments. In one embodiment, MAT 320 in conjunction with web server 318 and/or message server 316 may perform actions such as those described below in conjunction with FIGS. 4-6.

General Operation

Figure 4:
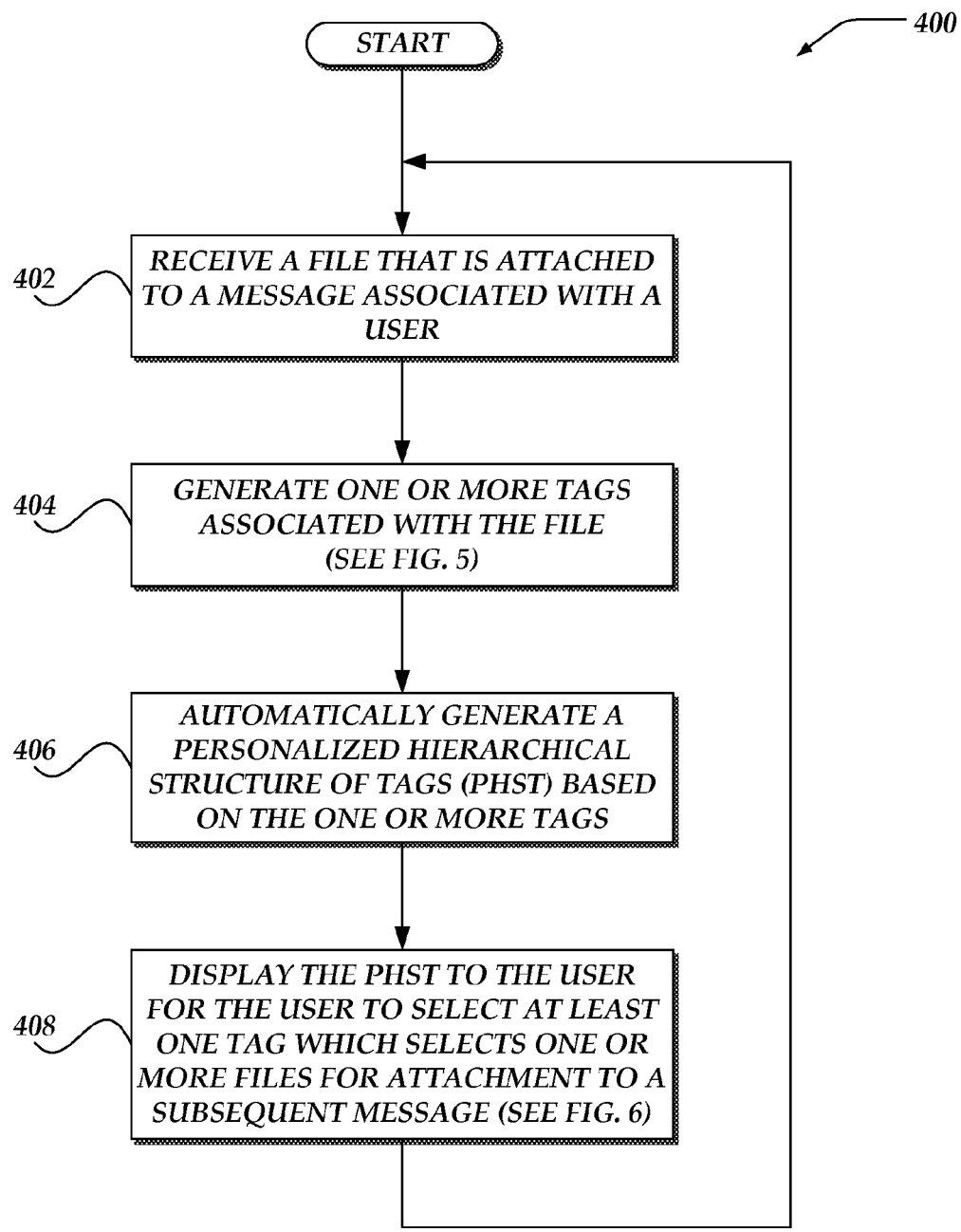
FIG. 4 illustrates a logical flow diagram generally showing one embodiment of an overview process for automatically generating and displaying a personalize hierarchical structure of tags.

The operation of certain aspects of the invention will now be described with respect to FIGS. 4-6. FIG. 4 illustrates a logical flow diagram generally showing one embodiment of an overview process for automatically generating and displaying a personalize hierarchical structure of tags ("PHST"). In some embodiments, process 400 of FIG. 4 may be implemented by and/or executed on a single network device, such as network device 300 of FIG. 3. In other embodiments, process 400 or portions of process 400 of FIG. 4 may be implemented by and/or executed on a plurality of network devices, such as network device 300 of FIG. 3.

Process 400 begins, after a start block, at block 402, where a file is received. In some embodiments, the file may be attached to a message associated with a user. In one embodiment, the file may be attached to a message that the user receives from another user. In another embodiment, the file may be uploaded by the user for attachment to a message that the user is sending to another user. In any event, the received file may be associated with the user and/or an account of the user. In some embodiments, the received file may be stored on a network device, such as network device 300 of FIG. 3.

Process 400 continues at block 404, which is described in more detail below in conjunction with FIG. 5. Briefly, however, at block 404, one or more tags associated with the received file are generated. In one embodiment, one or more automatic tags may be automatically generated. In another embodiment, one or more custom tags may be defined by the user.

Continuing next to block 406, a PHST is automatically generated for the user. The PHST may be automatically generated at or near real-time as files are received. In one embodiment, the PHST may be a dynamic PHST that is continually updated and modified as files are received. The PHST may be generated based on the one or more tags (e.g. automatic tags, custom tags, and/or any combination thereof) and may include a plurality of levels of tags. In some embodiments, one or more tags may be a hierarchical tag that identifies one or more parent tags within the hierarchical structure.

In one embodiment, a first level of tags may include, but is not limited to, tags that are automatically determined based on a file type of an associated file. In one non-limiting example, a first level of tags based on a file type may include, but is not limited to, "Documents," "Images," "Videos," or the like. In another embodiment, the first level of tags may also include a custom tag, which may include sublevels of custom tags that are defined by the user.

In some embodiments, a second level of tags may include, but is not limited to, tags that are automatically determined based on a file type of an associated file that utilizes a particular application. In one non-limiting example, the first level tag "Documents" may include, but is not limited to, second level tags "Word Files," "Excel Files," "Presentation Files," or the like. In one embodiment, the second level of tags may also include a custom tag, which may include sublevels of custom tags that are defined by the user.

In some embodiments, a single tag may be a sublevel tag to a plurality of upperlevel tags. In one non-limiting example, assume a user defines a custom tag as "European Vacations." This "European Vacations" tag may be a second level tag under "Custom Files" and a third level tag under the first level tag "Documents," which may be illustrated by a hierarchical tag "Documents/Custom Files/European Vacations." However, the "European Vacations" tag may also be a second level tag under a first level tag called "Custom Attachments," which may be illustrated by a hierarchical tag "Custom Attachments/European Vacations." These examples are not to be construed as limiting or exhaustive; rather, other tags, numbers of tags, levels of tags, or the like may also be employed.

In any event, process 400 then proceeds to block 408, which is described in more detail below in conjunction with FIG. 6. Briefly, however, at block 408, the PHST is displayed to the user, where the user is enabled to select at least one tag, which in turn selects one or more associated files for attachment to a subsequent message. In one embodiment, selection of a tag may automatically select sublevel tags of the selected tag, which in turn automatically selects one or more files associated with the selected tag and the sublevel tags. In some embodiments, the PHST may be displayed in a GUI that is provided to the user. Process 400 then loops to block 402 to receive another file. In one embodiment, the other file may be another file attached to a same message and/or a file attached to a different message.

Figure 5:
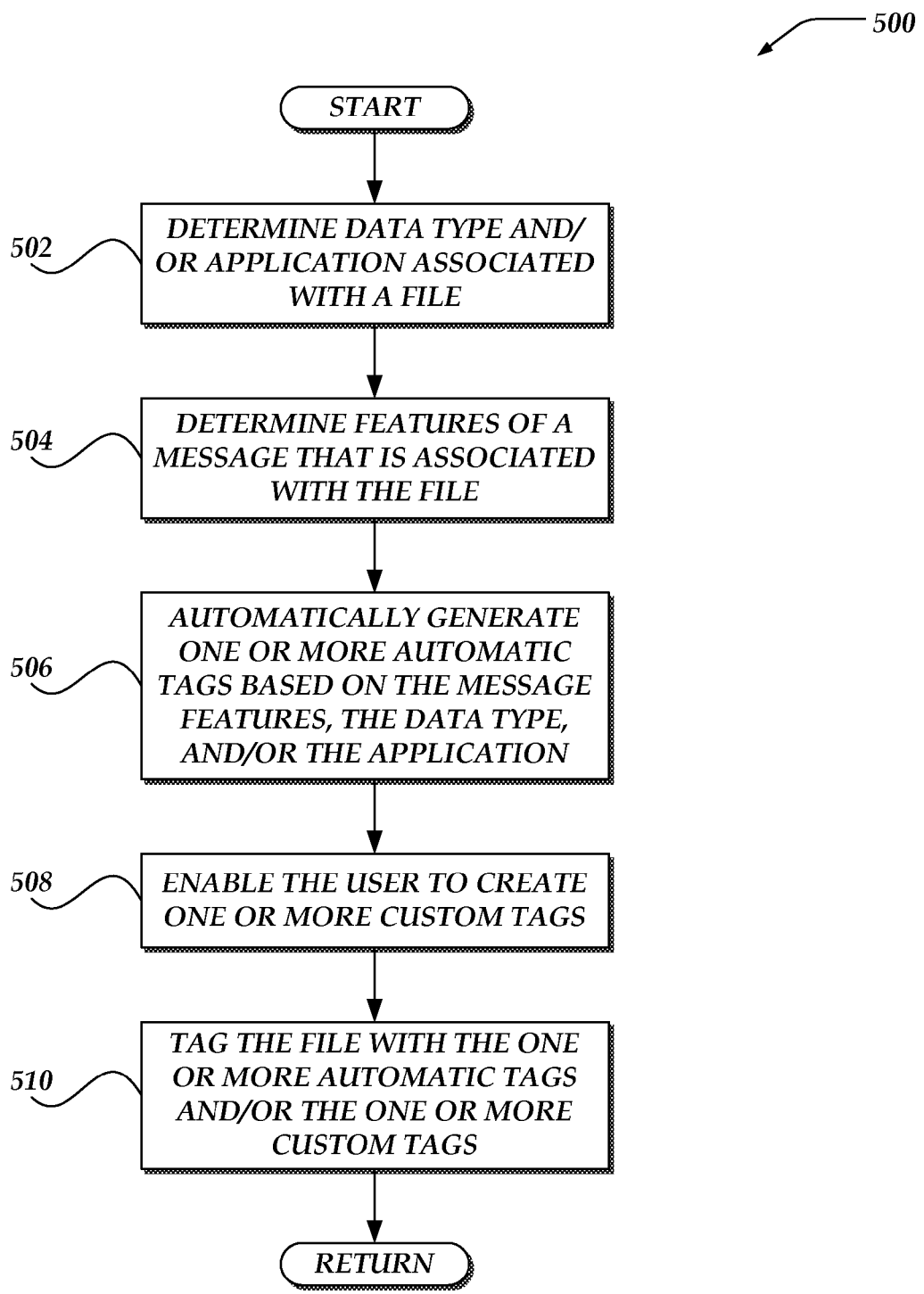
FIG. 5 illustrates a logical flow diagram generally showing one embodiment of a process for automatically generating automatic tags and creating custom tags.

FIG. 5 illustrates a logical flow diagram generally showing one embodiment of an overview process for generating automatic tags and creating custom tags. In some embodiments, process 500 of FIG. 5 may be implemented by and/or executed on a single network device, such as network device 300 of FIG. 3. In other embodiments, process 500 or portions of process 500 of FIG. 4 may be implemented by and/or executed on a plurality of network devices, such as network device 300 of FIG. 3.

Process 500 begins, after a start block, at block 502, where a data type and/or application associated with a file are determined. In one embodiment, the data type of an associated file may be based on a file extension, such as, for example, but is not limited to, '.doc', '.pdf', '.txt', '.ppf', 'jpg", '.mpeg', or the like. In another embodiment, the application of an associated file may be based on an application that can be utilized to access and/or execute the associated file, such as, for example, but is not limited to, Word, PowerPoint, Excel, or the like.

Next, at block 504, features of a message associated with the file are determined. In some embodiments, message features may include, but are not limited to, a sender, a message subject, an attachment name, or the like. In one embodiment, a message feature may be determined from an analysis of a body of the message to extract keywords from the message and/or identify a context of the message. In another embodiment, the automatic tags may be determined from on an analysis of the content of the file to extract keywords from the file and/or identify a context of the file.

Process 500 then flows to block 506, where one or more automatic tags are automatically generated based on the determined message features, data type, application, and/or the like. In some embodiments, a separate tag may be automatically generated for each message feature, data type, and/or application. In other embodiments, a tag may be automatically generated from any combination of message features, data type, and/or application. In one embodiment, each file may be associated with a plurality of automatic tags. In another embodiment, a tag may include a plurality of sublevel tags. In one embodiment, an automatic tag may be a hierarchical tag. For example, a file may include a "document" tag, a "word file" tag, a "document/word file" hierarchical tag, or the like. However, embodiments are not so limited, but rather, any suitable number, type, combination, or the like, of tags may be employed.

In some embodiments, a user profile may predetermine which message features may be utilized to automatically generate an automatic tag. In other embodiments, an automatic tag may be generated by removing and/or ignoring predetermined symbols, characters, words, phrases, or the like, from a message feature. For example, an automatic tag may be automatically generated without the characters "Re:", "Fw:", or the like; such as the automatic tag "Hello from Europe," or even "Europe," may be automatically generated from the message subject "Re: Hello from Europe." The removal of such predetermined characters may reduce a number of duplicate or extraneous tags in the PHST.

In yet other embodiments, an automatic tag associated with a current file may be generated from a previously generated automatic tag associated with a different file. In one embodiment, the different file may be associated with a same message and/or a different message as the current file.

In one embodiment, a comparative analysis may be performed between a current automatic tag associated with the current file and a previously generated automatic tag associated with a different file. In some embodiments, the current automatic tag may be automatically generated using one or more of the automatic tag generation embodiments described above.

In some embodiments, the comparative analysis may include a one-to-one comparison between the current automatic tag and the previously generated automatic tag to determine a similarity value. In one embodiment, the similarity value may be a percentage of like characters, words, symbols, or the like. In another embodiment, the similarity value may be a number of common terms between the current automatic tag and the previously generated automatic tag. However, embodiments are not so limited and other comparative analysis may be performed.

If the similarity value is above a predefined threshold, then the current automatic tag may be defined as a same tag as the previously generated automatic tag, such that the current file may be associated with the previously generated automatic tag. If the similarity value is below the predefined threshold, then the current automatic tag may be defined as a different tag, such that the current file may be associated with the current automatic tag.

In some embodiments, a common tag may be automatically generated between a current automatic tag and a previously generated automatic tag. In one embodiment, if a similarity value is below a first threshold value, but above a second threshold value, then a common tag may be automatically generated. However, other thresholds, and/or numbers of threshold may be utilized. In some embodiments, the current automatic tag and/or the previously generated automatic tag may be modified to be a sublevel of the common tag. In one non-limiting example, assume "Hello from Europe" is a previously generated automatic tag and "How was your trip to Europe" is a current automatic tag. Since both tags include the common term Europe, "Europe" may be automatically generated as a common tag. In one embodiment, the other tags may be modified to be sublevel hierarchical tags of the common tag, i.e. "Europe/Hello from Europe" and "Europe/How was your trip to Europe."

In one embodiment, the above comparative analysis may also be performed between current automatic tags and previously defined custom tags. However, embodiments are not so limited and other comparative analyses may be performed between different tags to automatically generate one or more automatic tags associated with a current file.

In any event, process 500 then proceeds to block 508, where the user is enabled to define one or more custom tags. In some embodiments, a GUI may be provided to the user, such that the user can input text to define a custom tag (e.g. by using a keyboard of a client device). In some embodiments, the GUI may be integrated into a same window for composing a message, a same window for navigating the PHST, a separate pop-up window, or any other suitable GUI that enables a user to input information to define/create a custom tag. In one embodiment, the user may define a custom tag for a file by selecting a previously defined custom tag and/or previously defined automatic tag.

In some embodiments, a custom tag may include a plurality of sublevel tags. In other embodiments, a user may be enabled to define a sublevel within the PHST for the custom tag. In one embodiment, the user may be enabled to select a previously determined tag (automatic tag and/or custom tag) within the PHST as a parent tag and/or sublevel tag to the custom tag. For example, a user may indicate that custom tag "European Vacation" is a sublevel tag of automatic tag "Hello from Europe."

In other embodiments, a custom tag may be automatically modified to generate a custom hierarchical tag. In one embodiment, the custom hierarchical tag may be a combination of a user defined custom tag and one or more automatic tags. In some embodiments, an automatic tag may be generated from a custom tag. In one non-limiting example a file may be associated with automatic tag "document/word file." A user may define custom tag "European Vacation" for the same file. From this custom tag the system may automatically generate automatic tag "custom" and may automatically generate a custom hierarchical tag as "document/word file/custom/European Vacation."

These examples of custom tags and automatic tags are not to be construed as limiting or exhaustive; rather, any suitable number, type, combination, or the like, of automatic tags and/or custom tags may be employed.

Proceeding next to block 510, the received file is tagged with the one or more automatic tags and/or the one or more custom tags. In one embodiment, each tag may be stored as metadata of an associated file. In another embodiment, an association between each tag and each file may be stored in a lookup table. However, embodiments are not so limited and other mechanism for maintaining an association between each of the one or more tags (automatic tags and/or custom tags) and an associated file is envisaged.

Process 500 then returns to a calling process to perform other actions.

Figure 6:
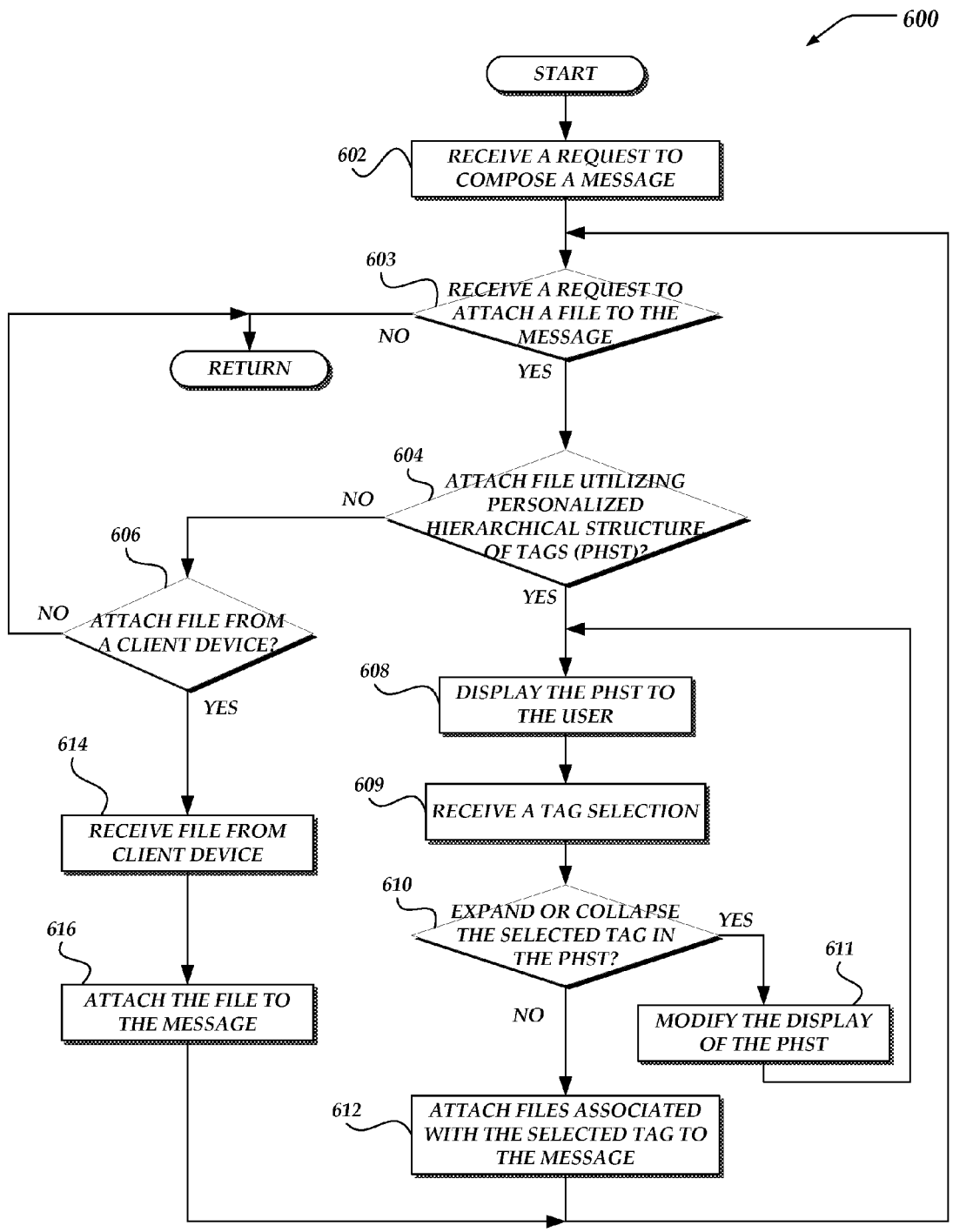
FIG. 6 illustrates a logical flow diagram generally showing one embodiment of a process for utilizing a personalized hierarchical structure of tags to attach a file to a message.

FIG. 6 illustrates a logical flow diagram generally showing one embodiment of an overview process for utilizing a personalized hierarchical structure of tags to attach a file to a message. In some embodiments, process 600 of FIG. 6 may be implemented by and/or executed on a single network device, such as network device 300 of FIG. 3. In other embodiments, process 600 or portions of process 600 of FIG. 6 may be implemented by and/or executed on a plurality of network devices, such as network device 300 of FIG. 3.

Process 600 begins after a start block at block 602, where a request to compose a message is received. In one embodiment, a request to compose a message may be received if a user clicks, selects, and/or otherwise activates a corresponding button, icon, link, or the like, to compose a message. In one embodiment, the user may already be logged into a message service account from a client device.

Process 600 continues to decision block 603, where a determination is made whether a request to attach a file to the message is received. In one embodiment, a request to attach a file to a message may be received if the user clicks, selects, and/or otherwise activates a corresponding button, icon, link, or the like, to attach a file. If a request to attach a file is received, processing proceeds to decision block 604; otherwise, processing returns to a calling process to perform other actions.

Process 600 then proceeds to decision block 604, where a determination is made whether a file is attached to the message utilizing a PHST. In one embodiment, the PHST may be utilized by default if a user provides a request to attach a file to the message. In another embodiment, the PHST may be utilized if the user clicks, selects, and/or otherwise activates a corresponding button, icon, link, or the like, to attach a file utilizing the PHST. If a file is attached utilizing the PHST, then processing flows to block 608; otherwise, processing flows to decision block 606.

At decision block 606, a determination is made whether to attach a file from a client device to the message. In one embodiment, a file from the client device may be attached to the message if the user clicks, selects, and/or otherwise activates a corresponding button, icon, link, or the like, to attach a file from the client device. If the file is attached from the client device, then processing flows to block 614; otherwise, processing returns to a calling process to perform other actions.

At block 614, a file is received from the client device. In one embodiment, the file may be uploaded from the client device, such as, for example, but not limited to, from a local hard drive, CD-ROM, or the like. In some embodiments, a GUI may be provided to the user to enable the user to upload the file from the client device. In one embodiment, the GUI may be provided to the user as a pop-up window, or the like.

Process 600 then flows to block 616, where the uploaded file is attached to the message. Process 600 then loops to decision block 603 to attach another file to the message.

If, at decision block 604, the file is attached utilizing the PHST, then process 600 flows to block 608. At block 608 the PHST is displayed to the user. In one embodiment, a GUI may be provided to the user to display the PHST. In some embodiments, the PHST may be displayed in a same window as an interface for composing the message, a non-limiting example of which is illustrated in FIG. 7B. In other embodiments, the PHST may be displayed in a pop-up window, and/or any other suitable user interface that enables the user to navigate the PHST.

In some embodiment, targeted advertisements may be provided to the user along with the PHST. In one embodiment, the targeted advertisement may be based on information associated with one or more tags within the PHST. In another embodiment, the targeted advertisement may be based on information associated with one or more visible tags within the PHST, such as if a tag is expanded to show sublevel tags.

Proceeding next to block 609, a tag selection is received. In one embodiment, a tag selection may be received through a GUI if a user clicks, selects, and/or otherwise activates a button, icon, link, text, or the like, associated with a tag. In some embodiments, a plurality of buttons may be associated with each tag within the PHST, where each button may be configured to enable different actions related to an associated tag.

In one embodiment, a first button may be configured to expand and/or collapse an associated tag to show or hide a sublevel of tags. In some embodiments, the first button may not be visible, enabled, or the like, through the GUI, if there are no sublevel tags of the associated tag. In another embodiment, a second button may be configured to select and attach associated files of an associated tag to a message. In some embodiments, the second button may be configured to attach an individual file to the message. In other embodiments, the second button may be configured to attach a plurality of files to the message, such as, for example, if a plurality of files are associated with the associated tag. In one embodiment, selection of a parent tag may automatically select all sublevel tags such that all files associated with the parent tag and sublevel tags may be attached to the message. In yet another embodiment, a third button may be configured to delete an association between an associated tag and associated files.

Although the foregoing is described with reference to buttons, embodiments are not so limited; rather, any suitable GUI input mechanism and/or combination of input mechanisms may be employed such that a user that clicks, selects, and/or otherwise activates a button, icon, link, text (i.e. labels/identifiers of a tag), tree expansion/collapse switch, selection box, or the like, that is associated with a tag, may represent selection of the associated tag. In some embodiments, a user may click on the text of a tag to open a pop-up option window, which may include options for attaching one or more associated files, expanding and/or collapsing the tag, deleting an association between the tag and associated files, or the like. In other embodiments, a user may double click and/or click and hold on the text of a tag to select the tag to perform different actions, as described herein, including but not limited to, attaching one or more associated files, expanding and/or collapsing the tag, deleting an association between the tag and associated files, or the like.

Process 600 then continues to decision block 610, where a determination is made whether or not to expand or collapse the selected tag in the PHST. In one embodiment, the selected tag may be expanded or collapsed if, at block 609, a user clicks, selects, and/or otherwise activates on a first button, link, icon, text, or the like, that is configured to expand or collapse the selected tag. In some embodiments, the selected tag may be expanded in the PHST if a user selects an expand button, tree expansion switch, text of a collapsed tag, or the like. In another embodiment, the selected tag may be collapsed in the PHST if the user selects a collapse button, tree collapse switch, text of an expanded tag, or the like. If the selected tag is to be expanded or collapsed in the PHST, processing flows to block 611; otherwise, processing flows to block 612.

At block 611, a display of the PHST is modified. In one embodiment, the display of the PHST may be modified to show a sub-level of tags of the selected tag. In another embodiment, the PHST may be modified to hide a sub-level of tags of the selected tag. Process 600 then loops to block 608 to display the modified PHST.

At block 612, one or more files associated with the selected tag are attached to the message. In one embodiment, an individual file associated with the selected tag may be attached to the message if, at block 609, a user clicks, selects, and/or otherwise activates on a second button, link, icon, text, or the like, that is configured to attach an individual file to the message. In another embodiment, a plurality of files associated with the selected tag may be attached to the message if, at block 609, a user clicks, selects, and/or otherwise activates on a second button, link, icon, text, or the like, that is configured to attach a plurality of files to the message. For example, if a user clicks an "Attach All" button associated with the tag "European Vacations," then all files associated with the tag "European Vacations" may be attached to the message. Thus, in one embodiment, a user may be enabled to attach a plurality of message attachment files from a plurality of received messages to a message by selecting an individual tag associated with the plurality of files. In yet another embodiment, a plurality of files associated the selected tag and associated with one or more sublevel tags of the selected tag may be attached to the message.

In any event, process 600 then loops to decision block 603 to attach another file to the message.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Alternative Embodiments and Use Case Illustrations

Figure 7A:
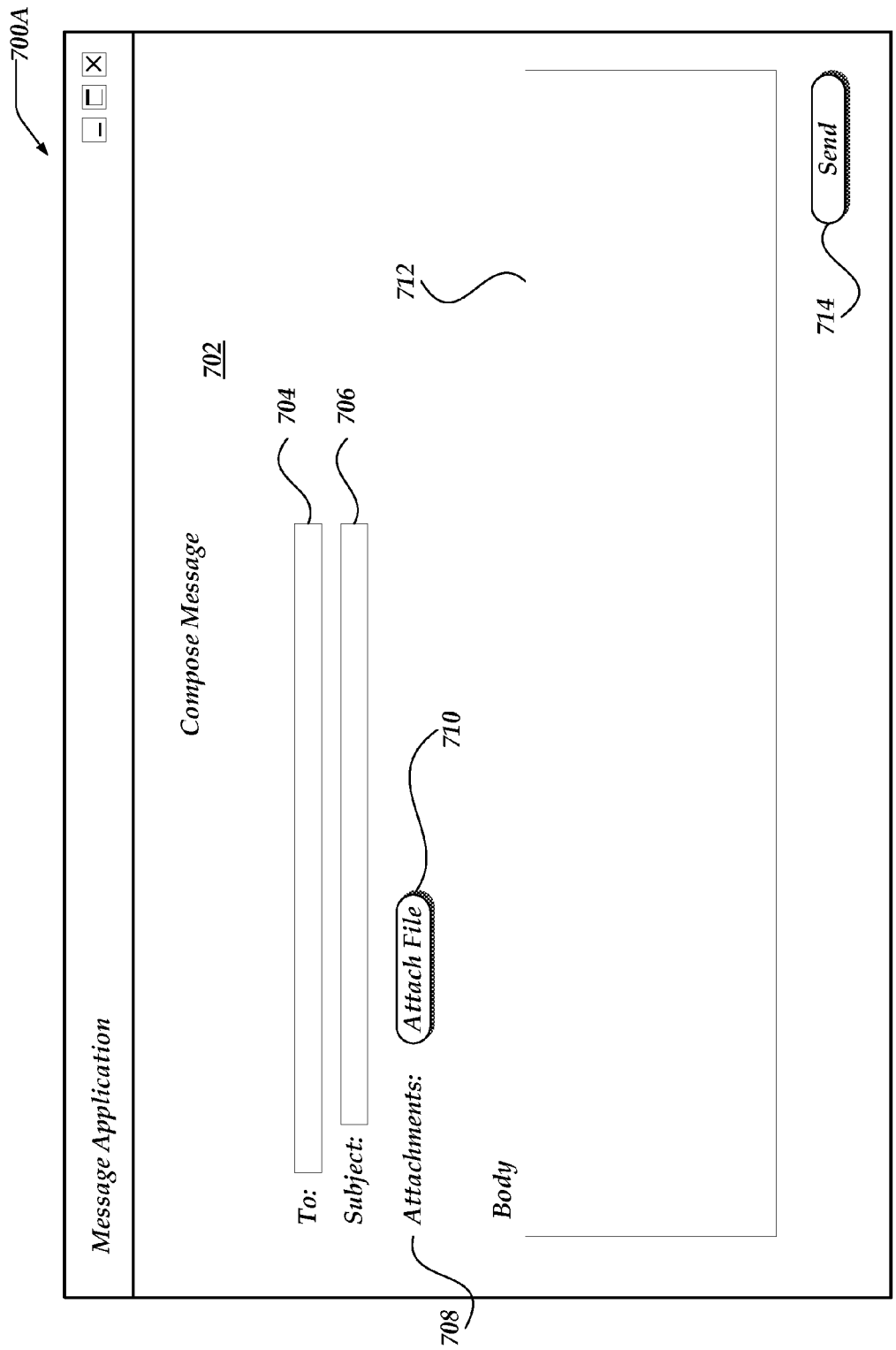
FIGS. 7A-7E show non-exhaustive examples of a use case of embodiments of a graphical user interface for navigating a personalized hierarchical structure of tags to attach a file to a message.
Figure 7B:
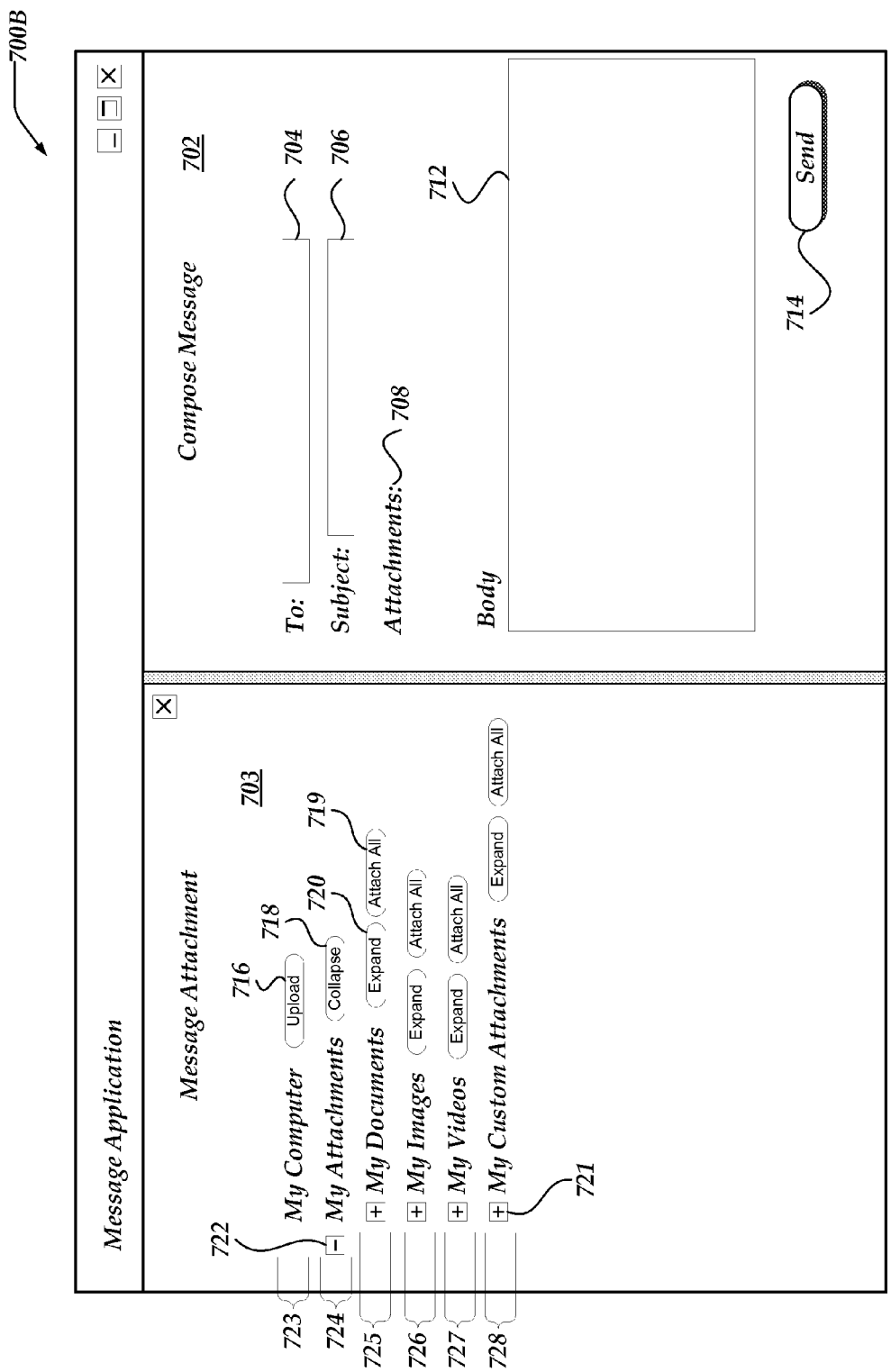

FIGS. 7A-7E show non-exhaustive examples of a use case of embodiments of a GUI for navigating a personalized hierarchical structure of tags to attach a file to a message;

FIG. 7A shows one non-exhaustive and non-limiting example of a GUI for composing a message. User interface 700A, as illustrated, may include message pane 702, which may include text block 704, text block 706, and text block 712. Text block 704 may enable a user to insert a recipient's address for the message, such as, for example, one or more email addresses. Text block 706 may enable a user to insert a subject of the message. Text block 712 may enable the user to compose a body of the message. Send button 714 may be configured to send the composed message to the recipient identified in text block 704.

Message pane 702 may also include attachments 708 and attach file button 710. Attachments 708 may identify files that are already attached to the message. In one embodiment, attachments 708 may include a list of labels and/or file names of attached files. In another embodiment, attachments 708 may include thumbnail images of attached files. Attach file button 710 may be configured to employ a user interface to enable a user to attach a file to the message. In one embodiment, another GUI may open to enable the user to select a file for attachment if the user clicks, selects, and/or otherwise activates attach file button 710. For example, if the user selects attach file button 710, a message attachment pane may open, such as message attachment pane 703 of FIG. 7B.

FIG. 7B shows one non-exhaustive and non-limiting example of a GUI for composing a message and attaching a file to the message utilizing a PHST. Similar to user interface 700A of FIG. 7A, user interface 700B may include message pane 702, which may include text block 704, text block 706, text block 712, attachments 708, and send button 714. In this example, attach file button 710 is removed from message pane 702 (i.e. not visible within the GUI) because message attachment pane 703 is open/enabled.

User interface 700B may also include message attachment pane 703. Message attachment pane 703 may include my computer 723 and my attachments 724. My computer 723 may be configured to enable a user to upload a file from a local client device of the user for attachment to the message. In some embodiments, upload button 716 may be selected and configured to open a pop-up window that enables the user to upload a file from the client device. However, embodiments are not so limited and other methods known to those skilled in the art of selecting and/or enabling a file upload feature may be employed, such as, for example, the text "My Computer" may be configured to be selectable to open a pop-up window that enables the user to upload a file from the client device.

My attachments 724 may be, in one embodiment, a PHST. A user may navigate through the PHST by expanding and/or collapsing tags to display and/or hide sublevels of tags. For example, tag in a first level of tags may be selected and expanded to show a second level of tags that are a sublevel of the selected tag. Similarly, a tag in the second level of tags may be selected and expanded to show a third level of tags that are a sublevel of the second level selected tag. Although only three levels of tags are described, embodiments are not so limited and other numbers of levels of tags bay be implemented.

As illustrated, a plurality of button, icons, text, links, or the like may be associated with each tag, where each button is configured to enable a different action related to an associated tag. For example, expand button 720 and attach all button 719 may be associated with my documents tag 725. A tag within my attachments 724 (i.e. the PHST) may be expanded if a user selects an expand button, such as, for example, expand button 720; selects a tree expansion switch, such as, for example, tree expansion switch 721; clicks on the text of a collapsed tag; and/or other suitable mechanism for selecting a tag to show a sublevel of tags. Similarly, a tag within the PHST may be collapsed if a user selects a collapse button, such as, for example, collapse button 718; selects a tree collapse switch, such as, for example, tree collapse switch 722; clicks on the text of an expanded tag; and/or other suitable mechanism for selecting a tag to hide a sublevel of tags.

In some embodiments, my attachments 724 may be initially expanded to show a first level of tags, such as tags 725-728, as illustrated. In other embodiments, my attachments 724 may be initially collapsed and may not initially show tags 725-728. In such an embodiment, a first level of tags (e.g. tags 725-728) may be displayed to a user if the user expands my attachments 724, such as, for example, by using one or more of the mechanisms for expanding a tag, as described above.

As illustrated in FIG. 7B, a first level of tags under my attachments 724 may include, but is not limited to, my documents tag 725, my images tag 726, my videos tag 727, and/or my custom attachments tag 728. My documents tag 725 may be a tag that was automatically generated based on a file type other than images and/or videos of one or more associated files. My images tag 726 may be a tag that was automatically generated based on an image file type of one or more associated files. My videos tag 727 may be a tag that was automatically generated based on a video file type of one or more associated files. My custom attachments tag 728 may include one or more custom tags that were defined by the user.

In some embodiments, attach all button 719 may be configured to select all files associated with the associated tag (i.e. my documents tag 725) to a message. In one embodiment, attach all button 719 may be configured to, if selected by a user, automatically select all sublevel tags of a parent tag (i.e. my documents tag 725) and attach all files associated with each sublevel tag to the message.

As illustrated, one or more of tags 725-728 may be configured to be expanded, such as, for example, by using one or more of the mechanisms for expanding a tag, as described above. In one non-limiting and non-exhaustive example, a user may expand my documents tag 725 to show a sublevel of tags, which is illustrated in FIG. 7C.

Figure 7C:
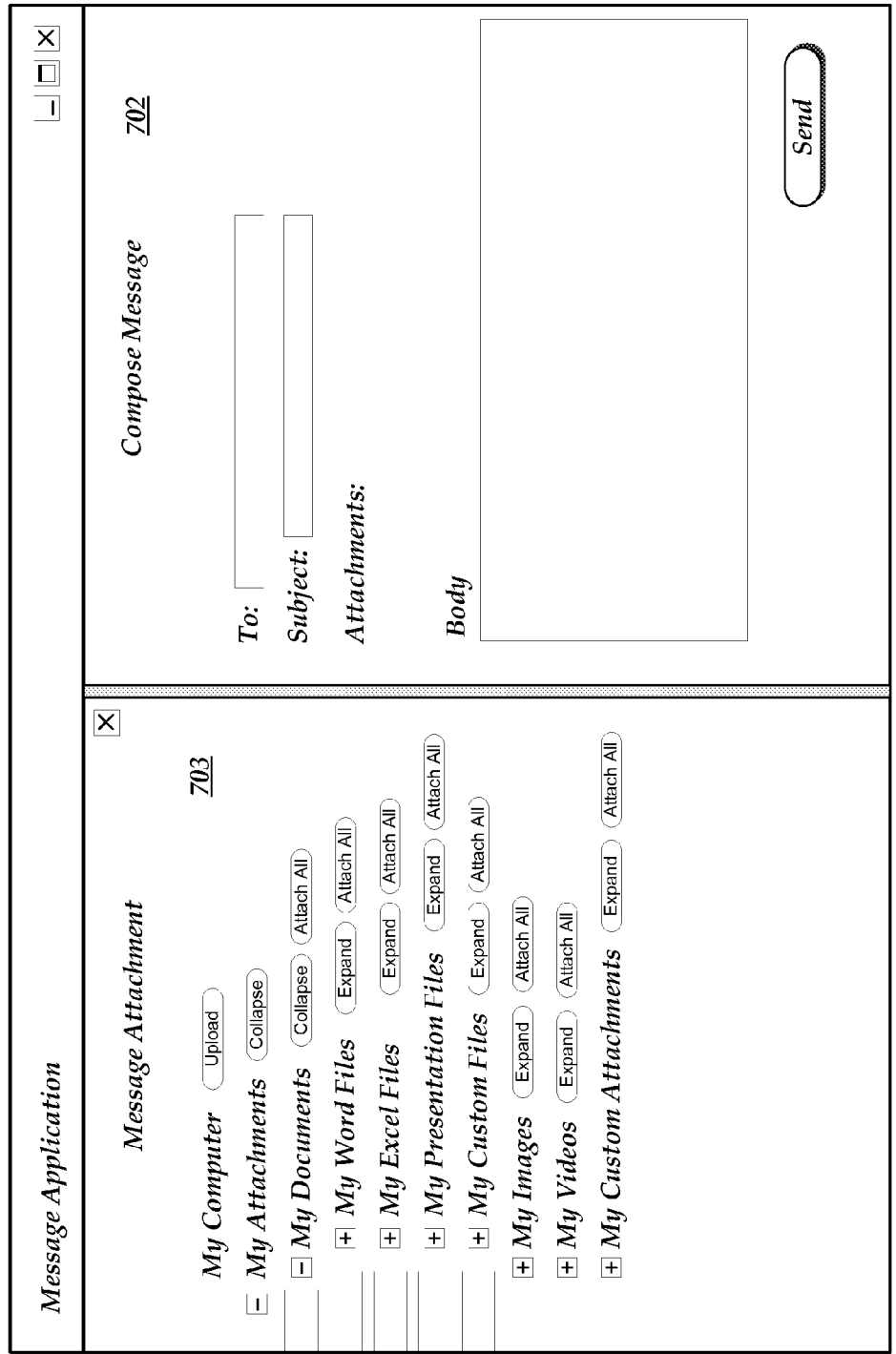

FIG. 7C shows one non-exhaustive and non-limiting example of a GUI for composing a message and attaching a file to the message utilizing a PHST. Similar to user interface 700B of FIG. 7B, user interface 700C may include message pane 702 and message attachment pane 703.

As illustrated, my documents tag 725 may be expanded to show tags 730-733. My word files tag 730 may be an automatic tag that was automatically generated based on a file type of one or more associated files that utilize a word processing application. My excel files tag 731 may be an automatic tag that was automatically generated based on a file type of one or more associated files that utilize a spreadsheet application. My presentation files tag 732 may be an automatic tag that was automatically generated based on a file type of one or more associated files that utilize a presentation application. My custom files tag 733 may be an automatic tag that may include one or more custom tags associated with one or more files that are also associated with my documents tag 725. In some embodiments, tags 730-733 may also be hierarchical tags that identify the hierarchical structure of the PHST, such as "my documents/my word files," "my documents/my excel files," "my documents/my presentation files," or "my documents/my custom files."

As illustrated, one or more of tags 730-733 may be configured to be expanded, such as, for example, by using one or more of the mechanisms for expanding a tag, as described above. Similarly, since my documents tag 725 is already expanded, my documents tag 725 may be configured to be collapsed. However, this illustration is not to be construed as limiting or exhaustive; rather, other tags may also be expanded, collapsed, selected for attachment, or the like. In one non-limiting and non-exhaustive example, a user may expand my word files tag 725, such as by using one or more of the mechanisms for expanding a tag, as described above, to show a sublevel of tags, which is illustrated in FIG. 7D, or alternatively in FIG. 7E.

Figure 7D:
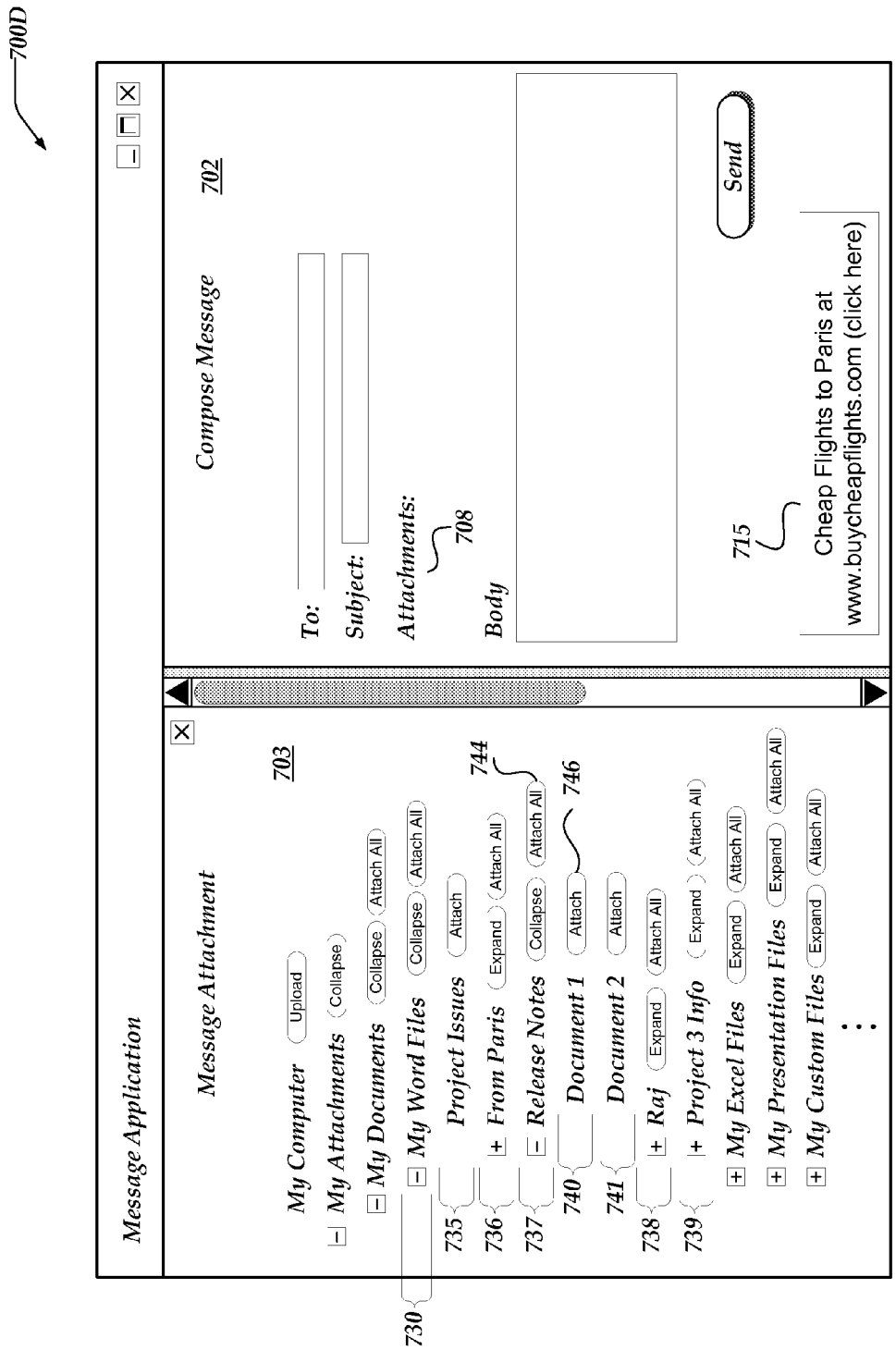

FIG. 7D shows one non-exhaustive and non-limiting example of a GUI for composing a message and attaching a file to the message utilizing a PHST. Similar to user interface 700C of FIG. 7C, user interface 700D may include message pane 702 and message attachment pane 703.

As illustrated, my word files tag 730 may be expanded to show tags 735-739. Similarly, release notes tag 737 may be expanded to show tags 740-741. In some embodiments, attach all button 744 may be configured to attach all files associated with a tag to a message. For example, documents associated with tags 740-741 (e.g. Document 1 and Document 2) may be attached to a message if a user selects attach all button 744. In another embodiment, attach button 746 may be configured to attach individual files to the message. For example, a document associated with tag 740 (e.g. Document 1) may be attached to a message if a user selects attach button 746. However, embodiments are not limited to these examples; rather, other tags may be expanded, collapsed, and or selected to attach associated files to the message.

In some embodiments, message attachment pane 703 may close and/or become disabled (as illustrated in FIG. 7A) if a user selects attach all button 744 and/or attach button 746. In one embodiment, message attachment pane 703 may not close and/or become disabled after a file is attached to a message. In some embodiments, files that are attached to a message, such as if a user selects attach all button 744 and/or attach button 746, may be identified under attachments 708.

In some embodiments, user interface 700D may be configured to enable a user to modify the PHST through the user interface. In one embodiment, each tag in message attachment pane 703 may include a delete tag button (not shown) that may be configured to delete an association between an associated tag and an associated file. In another embodiment, a user may be enabled to drag and drop one or more tags into another tag. For example, a user may be enabled to drag tag 741 and drop it into tag 736. In one embodiment, tag 741 may be automatically modified to be a sublevel tag of tag 736.

User interface 700D may also include targeted advertisement 715 in message pane 702. In one embodiment, the targeted advertisements may be based on information associated with one or more visible tags within the PHST. In one non-limiting example, tag 735 includes information "Paris," which may be utilized to select and display one or more targeted advertisements. Although targeted advertisement 715 is illustrated in message pane 702, embodiments are not so limited and targeted advertisement 715 may be included in message advertisement pane 703 (not shown), in a pop-up window, or the like.

Figure 7E:
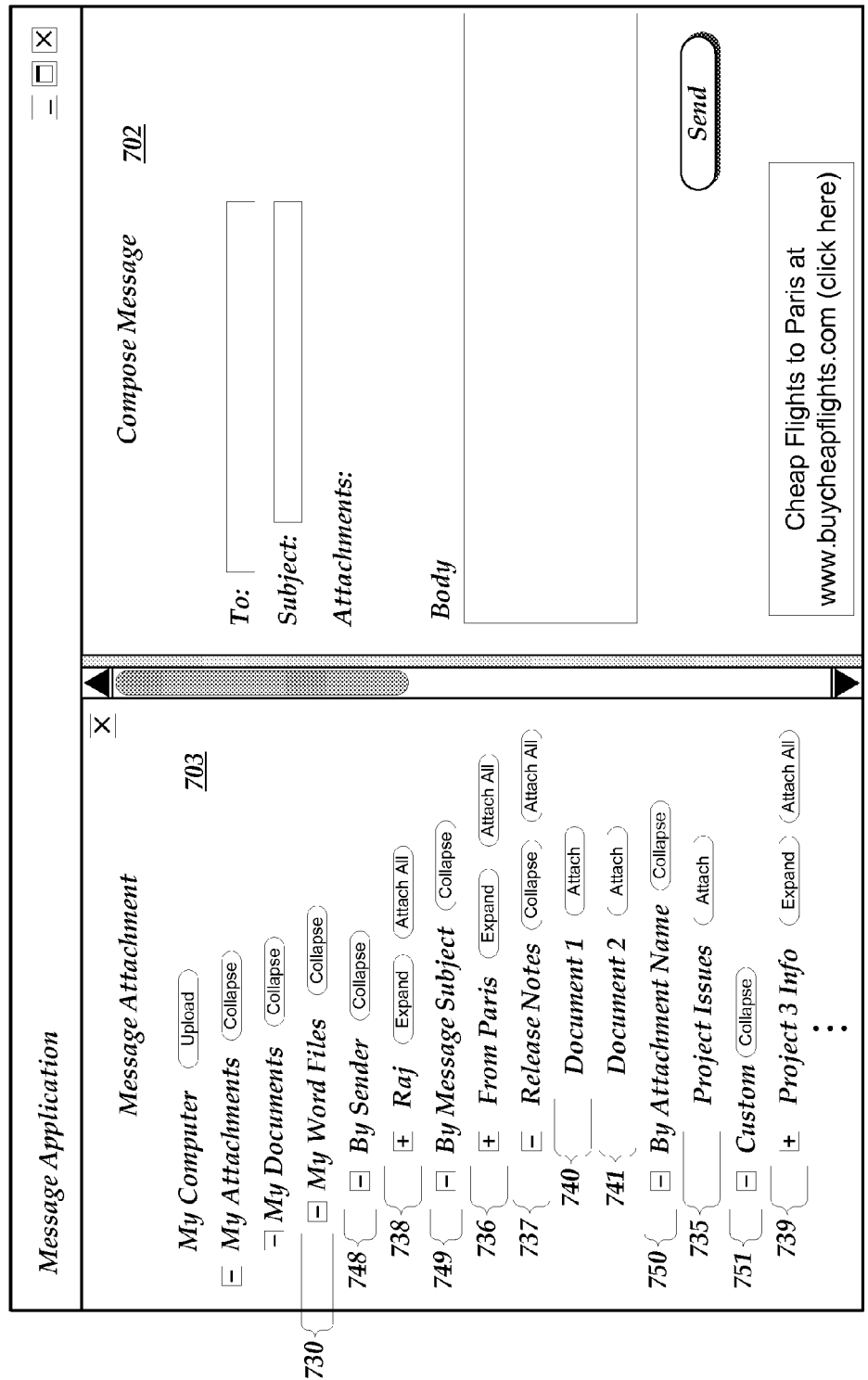

FIG. 7E shows an alternative embodiment of FIG. 7D of a GUI for composing a message and attaching a file to the message utilizing a PHST. Similar to user interface 700C of FIG. 7C, user interface 700E may include message pane 702 and message attachment pane 703.

As illustrated, my word files tag 730 may be expanded to show tags 748-751. Tags 748-751 may identify message features that are utilized to automatically generate tags 735-739. For example, as illustrated, tags 735-739 may be organized by sender tag 748, message subject tag 749, attachment name tag 750, and custom tags 751. Sender tag 748 may include one or more tags that are automatically generated based on a sender of an associated message. Message subject tag 749 may include one or more tags that were automatically generated based on a subject of an associated message. Attachment name tag 750 may include one or more tags that were automatically generated based on a name of an associated file. My custom files tag 739 may include one or more custom tags associated with one or more files that are also associated with my word files tag 730.

Figure 8:
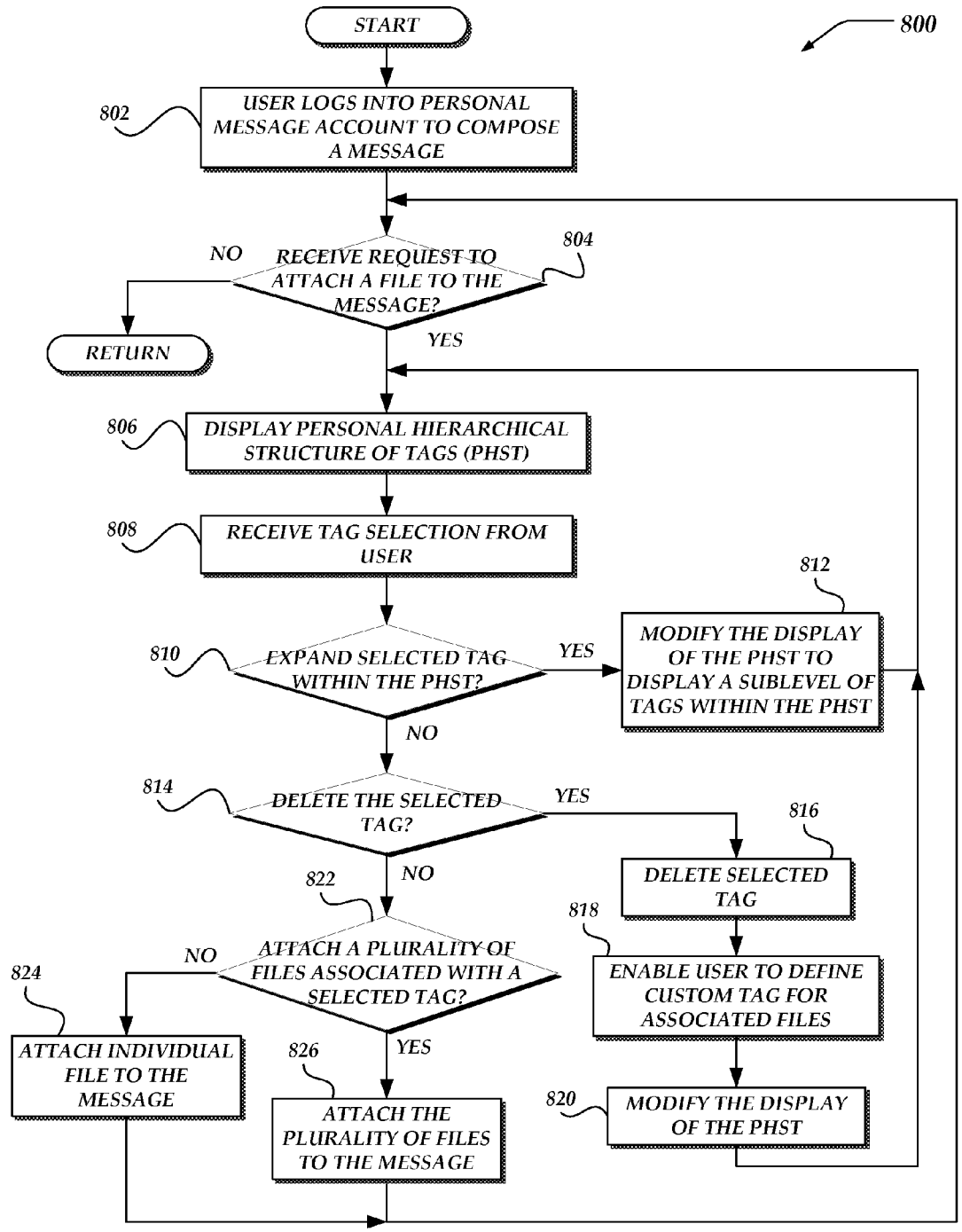
FIG. 8 illustrates a logical flow diagram generally showing one non-exhaustive example of a use case for composing a message and attaching a file to the message utilizing a personalize hierarchical structure of tags.

FIG. 8 illustrates a logical flow diagram generally showing one non-exhaustive example of a use case for composing a message and attaching a file to the message utilizing a personalize hierarchical structure of tags. In some embodiments, process 800 of FIG. 8 may be implemented by and/or executed on a single network device, such as network device 300 of FIG. 3. In other embodiments, process 800 or portions of process 800 of FIG. 8 may be implemented by and/or executed on a plurality of network devices, such as network device 300 of FIG. 3.

Process 800 begins, after a start block, at block 802, where a user logs into a personal message account to compose a message. In one embodiment, a user may provide a user identifier and a corresponding user passcode to log into the personal message account. In one embodiment, the message account may be an email account. However, embodiments are not so limited and other message account may be utilized. In one embodiment, after the user logs into the personal message account, the user may provide a request to compose a message, such as, for example, by clicking, selecting, and/or otherwise activating a corresponding button, icon, link, or the like, to compose a message.

Process 800 then proceeds to decision bock 804, where a determination is made whether a request to attach a file to a message is received. In one embodiment, a request to attach a file may be received similar to that which is described above in conjunction with decision block 603 of FIG. 6. If a request to attach a file to a message is received, then processing flows to block 806; otherwise, processing returns to a calling process to perform other actions.

At block 806, a PHST is displayed to the user. In one embodiment, the PHST may be displayed to the user similar to that which is described above in conjunction with block 608 of FIG. 6. Process 800 then proceeds to block 808 where a tag selection is received from the user. In one embodiment, the tag selection may be received similar to that which is described above in conjunction with block 609 of FIG. 6.

Process 800 next proceeds to decision block 810, where a determination is made whether the selected tag is expanded within the PHST. In one embodiment, the determination to expand the PHST may be similar to that which is described above in conjunction with decision block 610 of FIG. 6. If the selected tag is to be expanded within the PHST, then processing flows to block 812; otherwise, processing flows to block 814.

At block 812, a display of the PHST is modified to display a sublevel of tags within the PHST. In one embodiment, the display of the PHST may be modified similar to that which is described above in conjunction with block 611 of FIG. 6. Process 800 then loops to block 806 to display the modified PHST to the user.

If, at block 810, the selected tag is not expanded within the PHST, then processing flows to block 814. At decision block 814, a determination is made whether the selected tag is deleted. In one embodiment, the selected tag may be deleted if, at block 808, a user clicks, selects, and/or otherwise activates on a button, link, icon, text, or the like, that is configured to delete an association between the selected tag and an associated file. If the selected tag is to be deleted, then processing flows to block 816; otherwise, processing flows to block decision block 822.

At block 816, the selected tag is deleted. In one embodiment, an association between the selected tag and associated file(s) may be deleted. In one embodiment, the tag may be deleted from metadata of the associated file(s).

Process 800 continues at block 818, where the user is enabled to define a custom tag for the file(s) associated with the selected tag that was deleted at block 816. In one embodiment, a custom tag for the file may be defined similar to that which is described above in conjunction with block 508 of FIG. 5.

Process 800 then flows to block 820, where a display of the PHST is modified. In one embodiment, the display of the PHST may be modified to remove the deleted tag from the PHST. In another embodiment, the display of the PHST may be modified to add the custom tag defined at block 818 to the PHST. Process 800 then loops to block 806 to display the modified PHST to the user.

If at decision block 814 the selected tag is not deleted, process 800 flows to decision block 822. At decision block 822, a determination is made whether to attach a plurality of files associated with a selected tag to a message. In one embodiment, a plurality of files associated with the selected tag may be attached to the message if, at block 808, a user clicks, selects, and/or otherwise activates a button, icon, text, link, or the like, that is configured to attach a plurality of files to a message. In another embodiment, an individual file associated with the selected tag may be attached to the message if, at block 808, a user clicks, selects, and/or otherwise activates a button, icon, text, link, or the like, that is configured to attach an individual file to a message.

If a plurality of files associated with the selected tag are attached to the message, then processing flows to block 826. At block 826 a plurality of files associated with the selected tag are attached to the message. Process 800 then loops to decision block 804 to attach another file.

If a plurality of files associated with the selected tag are not attached to the message, then processing flows to block 824. At block 824, an individual file associated with the selected tag is attached to the message. Process 800 then loops to decision block 804 to attach another file.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A network device, comprising:
   a storage device for storing one or more files that are associated with a user of at least one client device; and
   a processor for enabling actions, the actions comprising:
   receiving one or more message file attachments, wherein the one or more message file attachments are associated with the user;
   automatically determining one or more automatic tags that are associated with the one or more message file attachments, wherein each of the one or more message file attachments is associated with at least one of the one or more automatic tags;
   automatically generating a personalized hierarchical structure of tags ("PHST") from the one or more automatic tags;
   receiving, from the user, one or more custom tags for at least one of the one or more message file attachments;

associating the at least one of the one or more message file attachments with the one or more custom tags;

automatically generating at least one custom generated tag using the one or more custom tags;

automatically modifying the PHST to include the at least one custom generated tag within the hierarchy; and displaying the PHST which separately indicates the one or more automatic tags and the at least one custom generated tag to the user such that the user is enabled to select at least one tag which in turn selects one or more files associated with the selected tag for attachment to a message.

2. The network device of claim 1, wherein the PHST includes at least a first level of tags and a second level of tags.

3. The network device of claim 1, wherein the processor enables further actions, the actions comprising:
receiving, from the user, a request to attach a file to the message;
displaying at least a first level of tags within the PHST to the user;
enabling the user to expand or collapse at least the first level of tags to display at least a second level of tags within the PHST to the user;
receiving, from the user, a tag selection of a tag from within the PHST;
and attaching, to the message, at least one file associated with the selected tag.

4. The network device of claim 3, wherein attaching the at least one file further comprises attaching a plurality of files associated with the selected tag from a plurality of received messages.

5. The network device of claim 3, wherein attaching the at least one file further comprises attaching a plurality of files associated with the selected tag and one or more sublevel tags of the selected tag.

6. The network device of claim 1, wherein the one or more automatic tags are determined from a feature of a message associated with a respective file attachment.

7. The network device of claim 1, wherein the one or more automatic tags are determined from a data type of an associated file.

8. The network device of claim 1, wherein the one or more automatic tags are determined from an application that is utilized to access or execute an associated file.

9. The network device of claim 1, wherein the processor further enables actions, the actions comprising:
receiving a request to delete an association between a file and one or more tags within the PHST; and
deleting the association between the file and the one or more tags.

10. A network device, comprising:
a transceiver for receiving and sending data; and
a graphical user interface that is displayable to a user and coordinated with a processor at the network device configured to enable actions, including:
automatically tagging each of one or more message file attachments with one or more automatic tags;
automatically generating a personalized hierarchical structure of tags ("PHST") from the one or more automatic tags;
associating the at least one of the one or message more file attachments with one or more custom tags received from the user for at least one of the one or more message file attachments;
automatically generating at least one custom generated tag using the one or more custom tags;
automatically modifying the PHST to include the at least one custom generated tag within the hierarchy; and
displaying the PHST which separately indicates the one or more automatic tags and the at least one custom generated tag to the user to enable the user to navigate the PHST and to select at least one tag from the PHST which in turn automatically selects one or more files that are tagged with the at least one selected tag; and
attaching the one or more files to a message.

11. The network device of claim 10, wherein the graphical user interface is configured to enable further actions, including:
receiving, from the user, a request to attach a file to the message;
receiving a user input configured to modify a display of the PHST such that at least a first level of tags and a second level of tags within the PHST are displayed to the user;
receiving a tag selection from the user; and
attaching, to the message, at least one file that is tagged with the tag selection.

12. The network device of claim 10, wherein the one or more automatic tags are determined from a data type of an associated file.

13. The network device of claim 10, wherein the graphical user interface is configured to enable further actions, including:
selecting an advertisement based on information associated with at least one of the one or more tags; and
displaying the advertisement to the user.

14. A system for classifying media content, comprising:
at least one network device that manages a communications over a network; and
one or more other network devices each having a processor configured to perform actions, the actions including:
receiving, from a client device, a request to compose a message;
providing, to a client device, a user interface that is configured to enable a user of the client device to compose the message;
receiving, through the user interface, a request to attach a file to the message;
displaying, to the user, a personalized hierarchical structure of tags ("PHST") that is automatically generated from one or more automatic tags that are associated with one or more message file attachments and automatically modified including at least one custom generated tag automatically generated using the one or more custom tags received from the user for the at least one of the one or more message file attachments, where the at least one of the one or more message file attachments is associated with the one or more custom tags, wherein the PHST separately indicates the one or more automatic tags and the at least one custom generated tag;
receiving, from the user, a tag selection of at least one tag from the PHST; and
attaching one or more files that are associated with the tag selection to the message.

15. The system of claim 14, wherein the one or more other network devices enables further actions, the actions comprising:
receiving a request to delete an association between a file and one or more tags within the PHST; and
deleting the association between the file and the one or more tags.

16. The system of claim 14, wherein the one or more other network devices enables further actions, the actions comprising:

enabling the user to navigate the PHST, including expanding and collapsing at least a first level of tags within the PHST to display at least a second level of tags within the PHST to the user.

17. The system of claim 14, wherein the one or more automatic tags are determined from an application that is utilized to access or execute an associated file.

18. The system of claim 14, wherein the processor further enables actions, the actions comprising:
displaying an advertisement to the user, wherein the advertisement is automatically selected based on information associated with at least one or more tags.

* * * * *